United States Patent
Luo et al.

(10) Patent No.: US 12,438,376 B2
(45) Date of Patent: Oct. 7, 2025

(54) DISTRIBUTED PHOTOVOLTAIC ENERGY SYSTEM

(71) Applicant: ALTENERGY POWER SYSTEM INC., Zhejiang (CN)

(72) Inventors: Yuhao Luo, Zhejiang (CN); Zhimin Ling, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 0 days.

(21) Appl. No.: 18/698,802

(22) PCT Filed: Feb. 21, 2022

(86) PCT No.: PCT/CN2022/077032
§ 371 (c)(1),
(2) Date: Apr. 5, 2024

(87) PCT Pub. No.: WO2023/151117
PCT Pub. Date: Aug. 17, 2023

(65) Prior Publication Data
US 2025/0007291 A1      Jan. 2, 2025

(30) Foreign Application Priority Data
Feb. 10, 2022   (CN) .......................... 202210124863.4

(51) Int. Cl.
H02J 3/38   (2006.01)
H02J 3/32   (2006.01)
H02J 7/35   (2006.01)

(52) U.S. Cl.
CPC  *H02J 3/38* (2013.01); *H02J 3/32* (2013.01); *H02J 7/35* (2013.01); *H02J 2300/24* (2020.01)

(58) Field of Classification Search
CPC ........ H02J 3/38; H02J 3/32; H02J 7/35; H02J 2300/24
See application file for complete search history.

(56) References Cited

U.S. PATENT DOCUMENTS

2017/0187323 A1      6/2017    Cao et al.

FOREIGN PATENT DOCUMENTS

| CN | 103280840 A | 9/2013 |
| CN | 203522308 U | 4/2014 |

(Continued)

OTHER PUBLICATIONS

International Search Report for PCT/CN2022/077032 mailed Oct. 8, 2022, ISA/CN.

*Primary Examiner* — Robert L Deberadinis
(74) *Attorney, Agent, or Firm* — Yue (Robert) Xu; Apex Attorneys at Law, LLP

(57) ABSTRACT

A distributed photovoltaic system includes N first photovoltaic modules each configured to convert solar energy into direct current power, N energy storage modules, and N inverters. Output terminals of the N first photovoltaic modules are connected to input terminals of the N energy storage modules in one-to-one correspondence. Output terminals of the N energy storage modules are connected to first input terminals of the N inverters in one-to-one correspondence. Output terminals of the N inverters are connected in parallel at a joint connected to a power grid or load. That is, a single energy storage module is connected to a single photovoltaic module and a single inverter, so that the single energy storage module is small in capacity and low in power. In addition, different energy storage modules are scattered.

11 Claims, 9 Drawing Sheets

(56) References Cited

FOREIGN PATENT DOCUMENTS

| | | |
|---|---|---|
| CN | 203761319 U | 8/2014 |
| CN | 107124004 A | 9/2017 |
| CN | 107579698 A | 1/2018 |
| CN | 207765966 U | 8/2018 |
| CN | 216699526 U | 6/2022 |

DISTRIBUTED PHOTOVOLTAIC ENERGY SYSTEM

The present application is a national phase application of PCT international patent application No. PCT/CN2022/077032, filed on Feb. 21, 2022 which claims priority to Chinese Patent Application No. 202210124863.4, titled "DISTRIBUTED PHOTOVOLTAIC SYSTEM", filed on Feb. 10, 2022 with the China National Intellectual Property Administration, all of which are is incorporated herein by reference in their entireties.

FIELD

The present disclosure relates to the field of photovoltaics, and in particular to a distributed photovoltaic system.

BACKGROUND

Among renewables, photovoltaic systems are increasingly applied. As illustrated in FIG. 1, a typical photovoltaic system generally includes a photovoltaic array composed of multiple photovoltaic modules that are connected, a storage battery and a combined inverter charger. The photovoltaic system operates as follows. The photovoltaic array converts solar energy into direct current power. The combined inverter charger supplies the direct current power to the storage battery. In addition, the combined inverter charger inverts direct current power supplied by the storage battery into alternating current power and supplies the alternating current power to a power grid or load for use.

Photovoltaic modules and storage batteries in the conventional photovoltaic system are centrally arranged. In a large-scale photovoltaic system, the battery has a large capacity and high power, resulting in a high risk of combustion and explosion. Therefore, for the large-scale photovoltaic system, requirements on design, installation, and firefighting are relatively high, resulting in increased cost of the system and increased difficulty in designing and installing the system.

Therefore, there is an urgent need fora solution to the above technical problems.

SUMMARY

A distributed photovoltaic system is provided according to the present disclosure. A single energy storage module is connected to a single photovoltaic module and a single inverter, and therefore is small in capacity and low in power. In addition, different energy storage modules are scattered, which greatly reduces the risk of combustion and explosion. Therefore, for the distributed photovoltaic system, requirements on design, installation, and firefighting are relatively low, which reduces the cost of the system and the difficulty in designing and installing the system.

To solve the above technical problems, a distributed photovoltaic system is provided according to the present disclosure. The distributed photovoltaic system includes N first photovoltaic modules each configured to convert solar energy into direct current power, N energy storage modules, and N inverters. N is a positive integer. Output terminals of the N first photovoltaic modules are connected to input terminals of the N energy storage modules in one-to-one correspondence. Output terminals of the N energy storage modules are connected to first input terminals of the N inverters in one-to-one correspondence. Output terminals of the N inverters are connected in parallel at a joint connected to a power grid or load. The N energy storage modules each are configured to store direct current power obtained through conversion by the first photovoltaic module connected to the energy storage module and supply the stored direct current power to the inverter connected to the energy storage module, for the inverter to convert the direct current power to alternating current power and supply the alternating current power to the grid or load for use.

In an embodiment, the distributed photovoltaic system further includes N second photovoltaic modules each configured to convert the solar energy into direct current power. Output terminals of the N second photovoltaic modules are connected to second input terminals of the N inverters in one-to-one correspondence. The inverter is further configured to convert the direct current power obtained through conversion by the second photovoltaic module connected to the inverter into alternating current power and supply the alternating current power to the power grid or load for use.

In an embodiment, the inverters are bi-directional inverters. The inverter is further configured to convert alternating current power from the power grid or load into direct current power and supply the direct current power to the energy storage module connected to the inverter for storage.

In an embodiment, the inverters are unidirectional inverters.

In an embodiment, the energy storage module includes a controller, an input switch, a photovoltaic charger, an output switch and a storage battery. A first terminal of the input switch serves as an input terminal of the energy storage module. A second terminal of the input switch is connected to the input terminal of the photovoltaic charger. An output terminal of the photovoltaic charger is connected to a power supply terminal of the storage battery. The power supply terminal of the storage battery is connected to a first terminal of the output switch. A second terminal of the output switch serves as an output terminal of the energy storage module. The controller is connected to a control terminal of the photovoltaic charger, a control terminal of the input switch and a control terminal of the output switch. The controller is configured to switch on the input switch when switching to a photovoltaic charging mode to control the photovoltaic charger to charge the storage battery with the direct current power obtained through conversion by the first photovoltaic module; and switch on the output switch when switching to a battery discharging mode, for the inverter connected to the energy storage module to convert the direct current power supplied by the storage battery into alternating current power and supply the alternating current power to the power grid or load for use.

In an embodiment, in a case that the inverters are bi-directional inverters, the energy storage module further includes a direct-current charger connected to the power supply terminal of the storage battery and the first terminal of the output switch. The controller is further configured to switch on the output switch when switching to an alternating-current charging mode, for the inverter to convert the alternating current power from the power grid or load into direct current power and supply the direct current power to the storage battery via the direct-current charger.

In an embodiment, the energy storage module further includes a short-circuit switch. A first terminal of the short-circuit switch is connected to the first terminal of the input switch at a joint that serves as the input terminal of the energy storage module. A second terminal of the short-circuit switch is connected to the second terminal of the output switch at a joint that serves as the output terminal of the energy storage module. A control terminal of the short-circuit switch is connected to the controller. The controller is further configured to switch on the short-circuit switch when switching to a photovoltaic inverting mode, for the inverter to convert the direct current power obtained through conversion by the first photovoltaic module connected to the inverter into alternating current power and supply the alternating current power to the power grid or load for use.

In an embodiment, the controller is further connected to the storage battery, and the controller is configured to switch between operating modes based on a state of the storage battery.

In an embodiment, the energy storage module is installed in a space under the first photovoltaic module connected to the energy storage module.

A distributed photovoltaic system is provided according to the present disclosure. The system includes N first photovoltaic modules, N energy storage modules and N inverters. Output terminals of the N first photovoltaic modules are connected to input terminals of the N energy storage modules in one-to-one correspondence. Output terminals of the N energy storage modules are connected to first input terminals of the N inverters in one-to-one correspondence. Output terminals of the N inverters are connected in parallel at a joint that is connected to a power grid or load. It can be seen that a single energy storage module is connected to a single photovoltaic module and a single inverter, so that the single energy storage module is small in capacity and low in power. In addition, different energy storage modules are scattered, which greatly reduces the risk of combustion and explosion. Therefore, for the distributed photovoltaic system, requirements on design, installation, and firefighting are relatively low, which reduces the cost of the system and the difficulty in designing and installing the system.

BRIEF DESCRIPTION OF THE DRAWINGS

In order to more clearly describe technical solutions in the embodiments of the present disclosure, drawings to be used in the description of the embodiments or the conventional technology are briefly introduced hereinafter. It is apparent that the drawings described below show merely the embodiments of the present disclosure, and those skilled in the art can obtain other drawings based on the provided drawings without any creative effort.

DETAILED DESCRIPTION OF THE EMBODIMENTS

A distributed photovoltaic system is provided according to the present disclosure. A single energy storage module is connected to a single photovoltaic module and a single inverter, so that the single energy storage module is small in capacity and low in power. In addition, different energy storage modules are scattered, which greatly reduces the risk of combustion and explosion. Therefore, for the distributed photovoltaic system, requirements on design, installation, and firefighting are relatively low, which reduces the cost of the system and the difficulty in designing and installing the system.

In order to make objectives, technical solutions and advantages of the present disclosure clearer, technical solutions in the embodiments of the present disclosure will be clearly and completely described below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Figure 1:
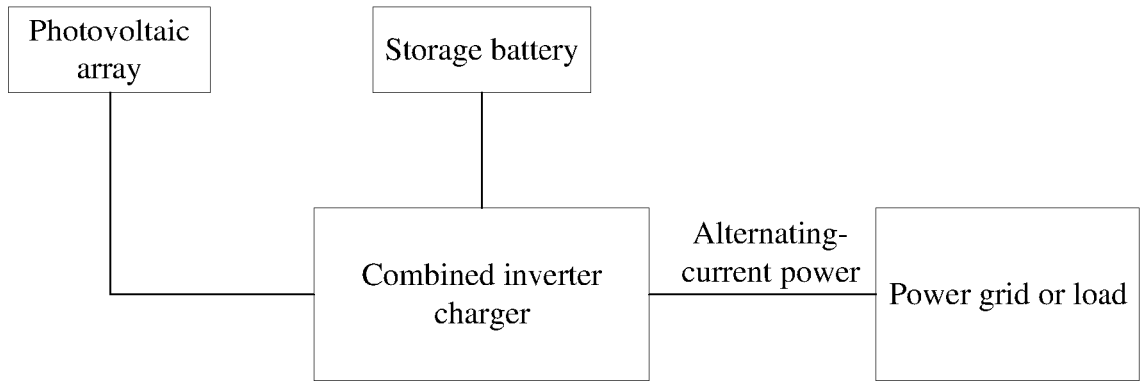
FIG. 1 is a schematic structural diagram illustrating a photovoltaic system according to the conventional technology.
Figure 2:
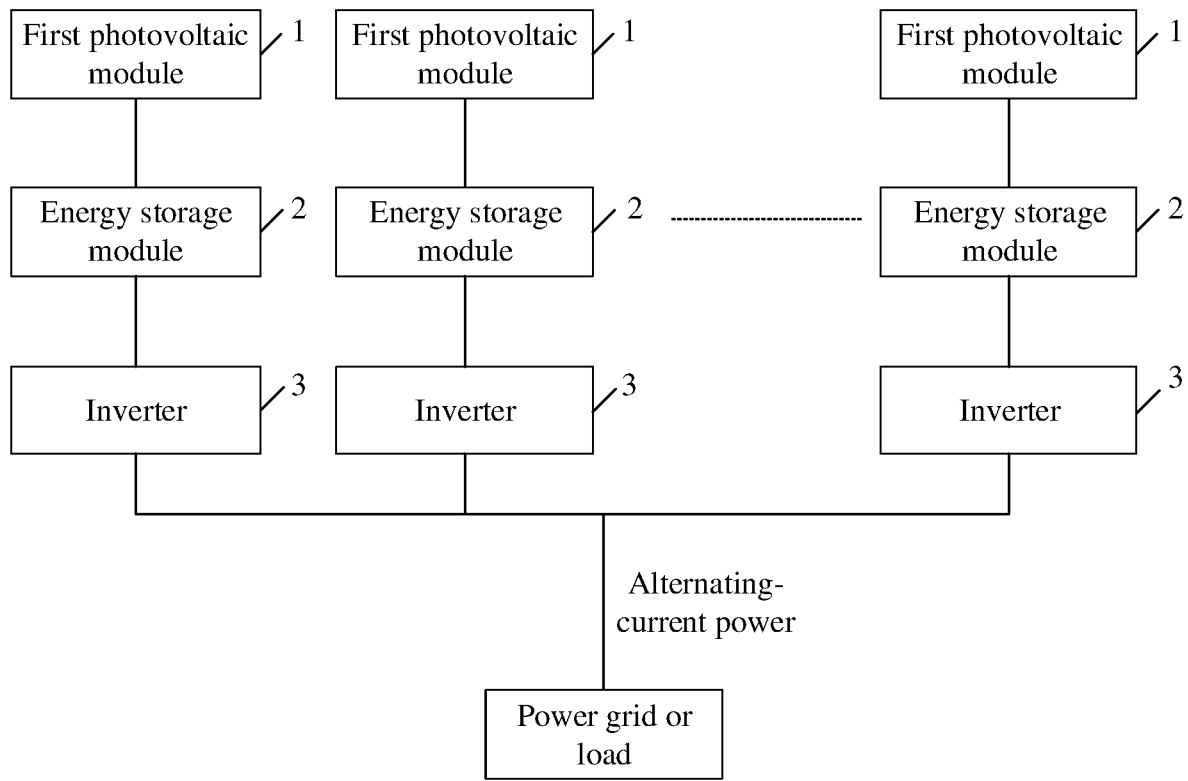
FIG. 2 is a schematic structural diagram illustrating a distributed photovoltaic system according to an embodiment of the present disclosure.

FIG. 2 is a schematic structural diagram illustrating a distributed photovoltaic system according to an embodiment of the present disclosure.

The distributed photovoltaic system includes N first photovoltaic modules 1, N energy storage modules 2 and N inverters 3. The N first photovoltaic modules 1 each are configured to convert solar energy into direct current power. N is a positive integer.

Output terminals of the N first photovoltaic modules 1 are connected to input terminals of the N energy storage modules 2 in one-to-one correspondence. Output terminals of the N energy storage modules 2 are connected to first input terminals of the N inverters 3 in one-to-one correspondence. Output terminals of the N inverters 3 are connected in parallel at a joint that is connected to a power grid or load.

The energy storage module 2 is configured to store direct current power converted by the first photovoltaic module 1 connected to the energy storage module 2 and supply the stored direct current power to the inverter 3 connected to the energy storage module 2, for the inverter 3 to convert the direct current power into alternating current power and supply the alternating current power to the grid or load.

The distributed photovoltaic system according to the present disclosure includes but is not limited to N first photovoltaic modules 1, N energy storage modules 2 and N inverters 3. The distributed photovoltaic system operates as follows.

A single first photovoltaic module 1 is connected to a single energy storage module 2, and the single energy storage module 2 is connected to a single inverter 3. The single first photovoltaic module 1, the single energy storage module 2 and the single inverter 3 form a first photovoltaic subsystem. The first photovoltaic subsystem operates as follows. The first photovoltaic module 1 converts solar energy into direct current power and supplies the direct current power to the energy storage module 2 connected to the first photovoltaic module 1. The energy storage module 2 stores the direct current power supplied by the first photovoltaic module 1 and supplies the stored direct current power to the inverter 3 connected to the energy storage module 2. The inverter 3 converts the direct current power supplied by the energy storage module 2 into alternating current power and supplies the alternating current power to the power grid or load for use.

It can be seen that in the present disclosure, a single energy storage module is connected to a single photovoltaic module and a single inverter, so that the single energy storage module is small in capacity and low in power. In addition, different energy storage modules are scattered, which greatly reduces the risk of combustion and explosion. Therefore, for the distributed photovoltaic system, requirements on design, installation, and firefighting are relatively low, which reduces the cost of the system and the difficulty in designing and installing the system.

Figure 3:
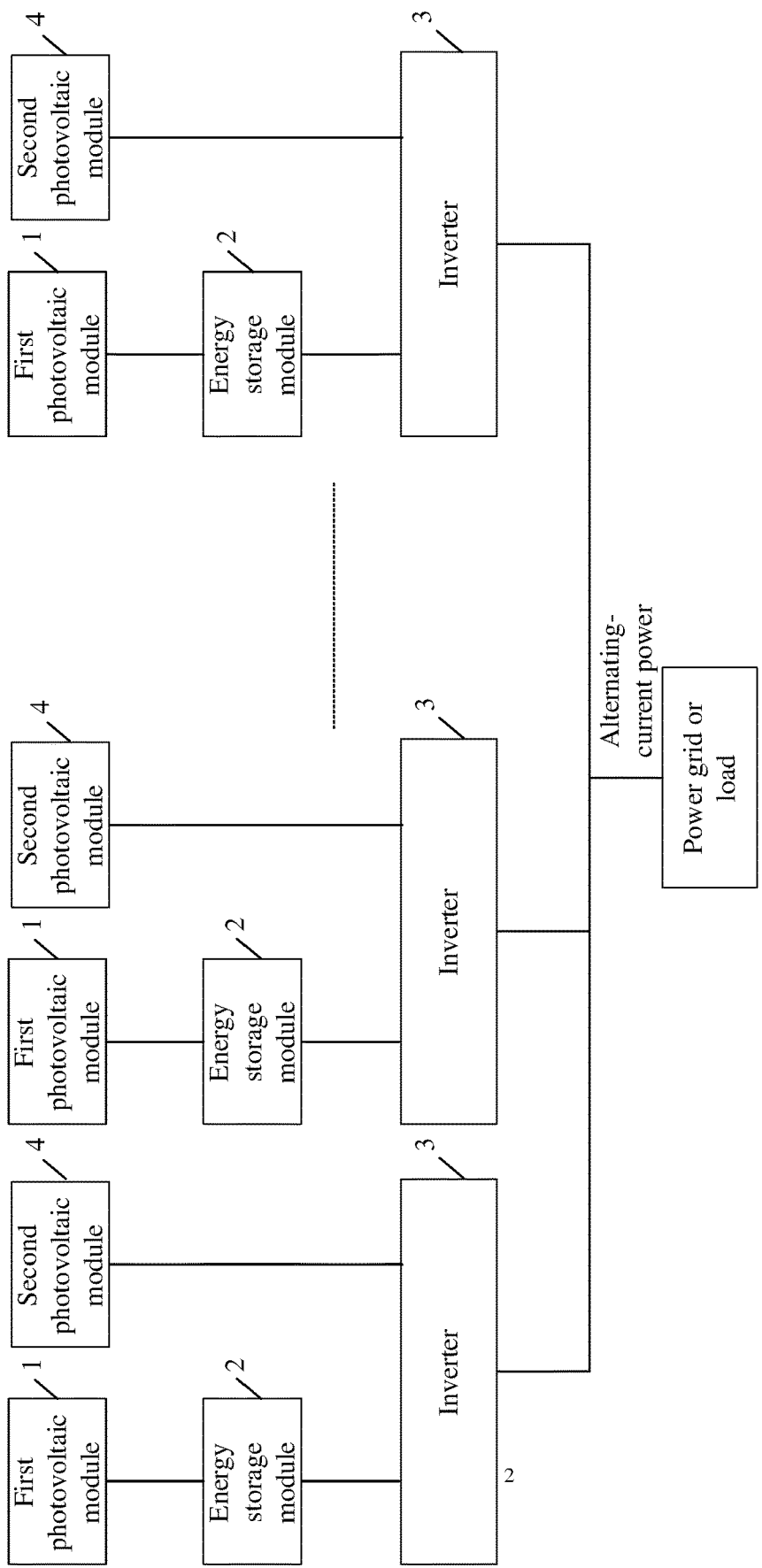
FIG. 3 is a schematic structural diagram illustrating the distributed photovoltaic system according to another embodiment of the present disclosure.

On the basis of the above embodiments, FIG. 3 is a schematic structural diagram illustrating the distributed photovoltaic system according to another embodiment of the present disclosure.

In an embodiment, the distributed photovoltaic system further includes N second photovoltaic modules 4 each configured to convert solar energy into direct current power.

Output terminals of the N second photovoltaic modules 4 are connected to second input terminals of the N inverters 3 in one-to-one correspondence.

The inverter 3 is further configured to convert the direct current power obtained through conversion by the second photovoltaic module 4 connected to the inverter 3 into alternating current power and supply the alternating current power to the power grid or load for use.

Further, the distributed photovoltaic system according to the present disclosure further includes but is not limited to N second photovoltaic modules 4. The distributed photovoltaic system operates as follows.

The inverter 3 is further connected to a second photovoltaic module 4 in addition to the energy storage module 2. The inverter 3 may be connected to more other components as needed, which is not limited in the present disclosure.

A single second photovoltaic module 4 and a single inverter 3 form a second photovoltaic subsystem. The second photovoltaic subsystem operates as follows. The second photovoltaic module 4 converts solar energy into direct current power and supplies the direct current power to the inverter 3 connected to the second photovoltaic module 4. The inverter 3 converts the direct current power supplied by the second photovoltaic module 4 into alternating current power, and supplies the alternating current power to the power grid or load for use.

It can be seen that the alternating current power supplied by the inverter to the power grid or load is from the energy storage module or the second photovoltaic module.

Figure 4:
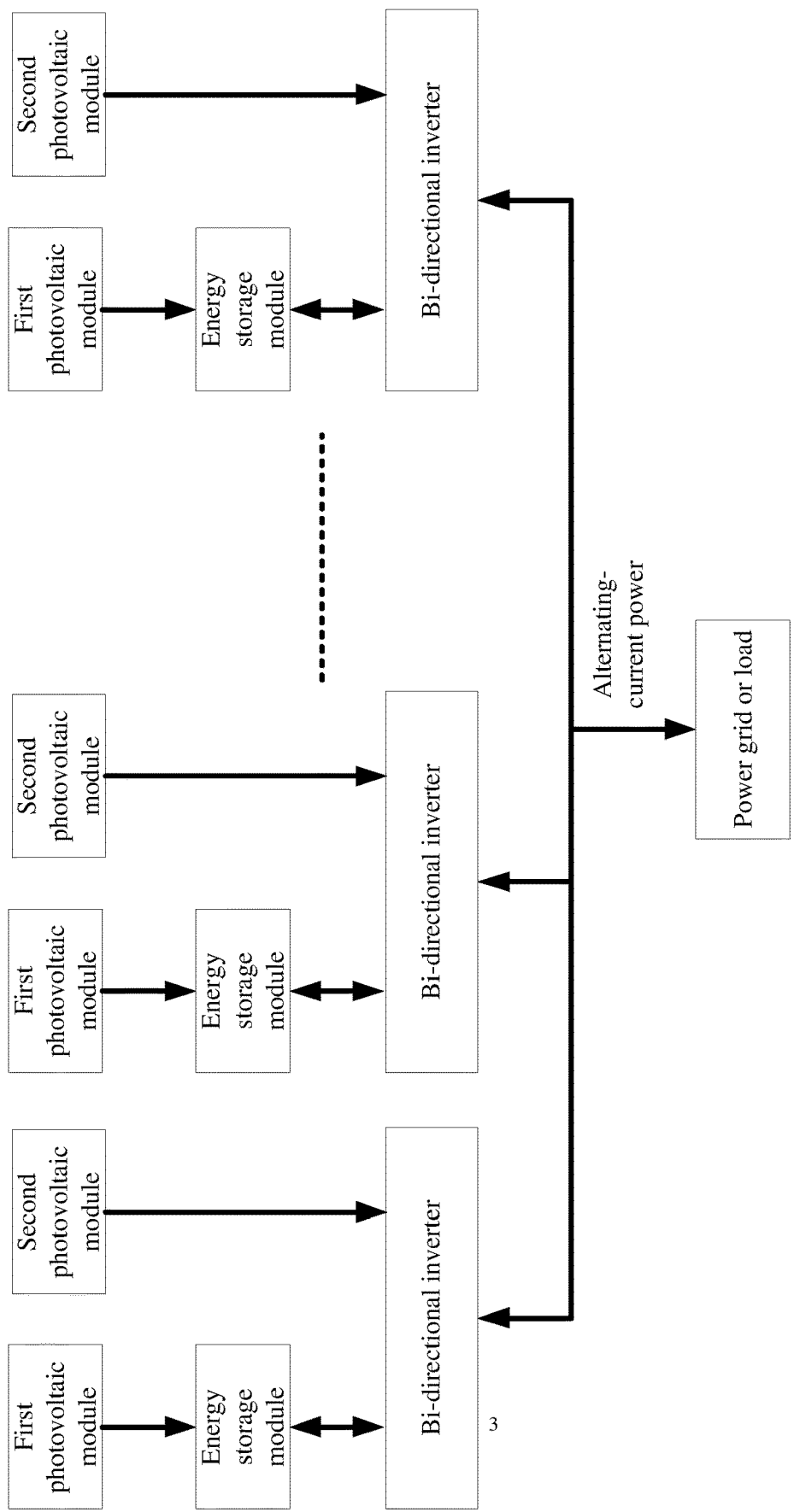
FIG. 4 is a schematic structural diagram illustrating the distributed photovoltaic system in detail according to an embodiment of the present disclosure.

FIG. 4 is a schematic structural diagram illustrating the distributed photovoltaic system in detail according to an embodiment of the present disclosure.

In an embodiment, the inverters 3 are bi-directional inverters.

The inverter 3 is further configured to convert alternating current power from the power grid or load into direct current power and supply the direct current power to the energy storage module 2 connected to the inverter 3 for storage.

The inverters 3 according to the present disclosure may be bi-directional inverters. That is, the inverter 3 is capable of converting direct current power into alternating current power (inverter mode) and converting alternating current power into direct current power (rectifier mode). It should be noted that the inverter 3 operates in the inverter mode by default. The input terminal and the output terminal of the inverter 3 reverse their roles as the inverter 3 switches to the rectifier mode.

When the inverter 3 operates in the inverter mode, the inverter 3 converts the direct current power supplied by the energy storage module 2 or the second photovoltaic module 4 into alternating current power and supplies the alternating current power to the power grid or load for use. When the inverter 3 operates in the rectifier mode, the inverter 3 converts the alternating current power from the power grid or load into direct current power and supplies the direct current power to the energy storage module 2 connected to the inverter 3 for storage.

Figure 5:
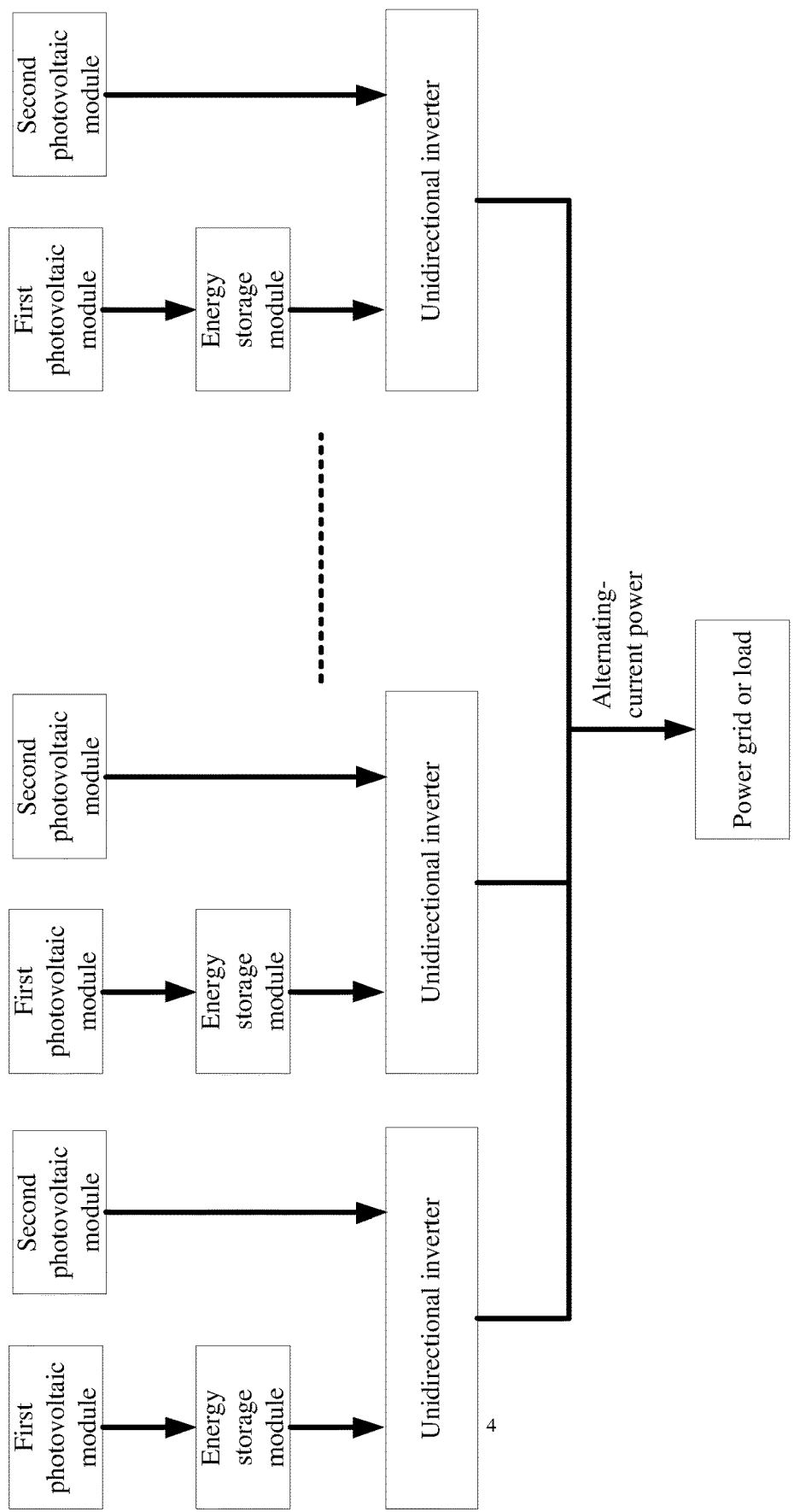
FIG. 5 is a schematic structural diagram illustrating the distributed photovoltaic system in detail according to another embodiment of the present disclosure.

FIG. 5 is a schematic structural diagram illustrating the distributed photovoltaic system in detail according to another embodiment of the present disclosure.

In an embodiment, the inverters 3 are unidirectional inverters.

The inverters 3 according to the present disclosure may be unidirectional inverters. That is, the inverter 3 operates in the inverter mode only without the rectifier mode. In this case, the energy storage module 2 is charged by only the first photovoltaic module 1, which reduces the cost of the system and simplifies the installation.

Figure 6:
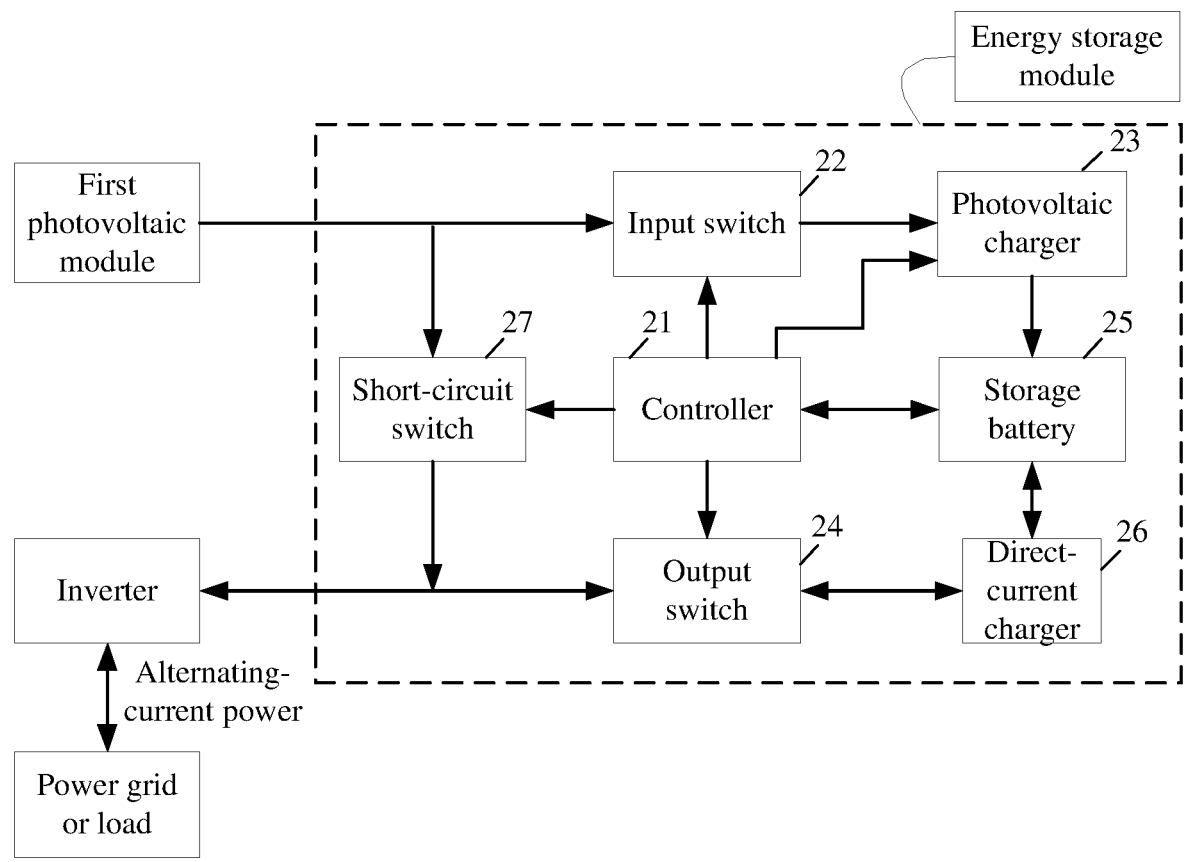
FIG. 6 is a schematic structural diagram illustrating an energy storage module according to an embodiment of the present disclosure.

FIG. 6 is a schematic structural diagram illustrating the energy storage module according to an embodiment of the present disclosure.

In an embodiment, the energy storage module 2 includes a controller 21, an input switch 22, a photovoltaic charger 23, an output switch 24 and a storage battery 25.

A first terminal of the input switch 22 serves as an input terminal of the energy storage module 2, and a second terminal of the input switch 22 is connected to the input terminal of the photovoltaic charger 23. An output terminal of the photovoltaic charger 23 is connected to a power supply terminal of the storage battery 25, and the power supply terminal of the storage battery 25 is connected to a first terminal of the output switch 24. A second terminal of the output switch 24 serves as an output terminal of the energy storage module 2. The controller 21 is connected to a control terminal of the photovoltaic charger 23, a control terminal of the input switch 22 and a control terminal of the output switch 24.

The controller 21 is configured to switch on the input switch 22 when switching to a photovoltaic charging mode, to control the photovoltaic charger 23 to supply the storage battery 25 with the direct current power obtained through conversion by the first photovoltaic module 1; and switch on the output switch 24 when switching to a battery discharging mode, for the inverter 3 connected to the energy storage module to convert the direct current power supplied by the storage battery 25 into alternating current power and supply the alternating current power to the power grid or load for use.

The energy storage module 2 according to the present disclosure includes but is not limited to the controller 21, the input switch 22, the photovoltaic charger 23, the output switch 24 and the storage battery 25. The energy storage module 2 operates as follows.

Figure 7:
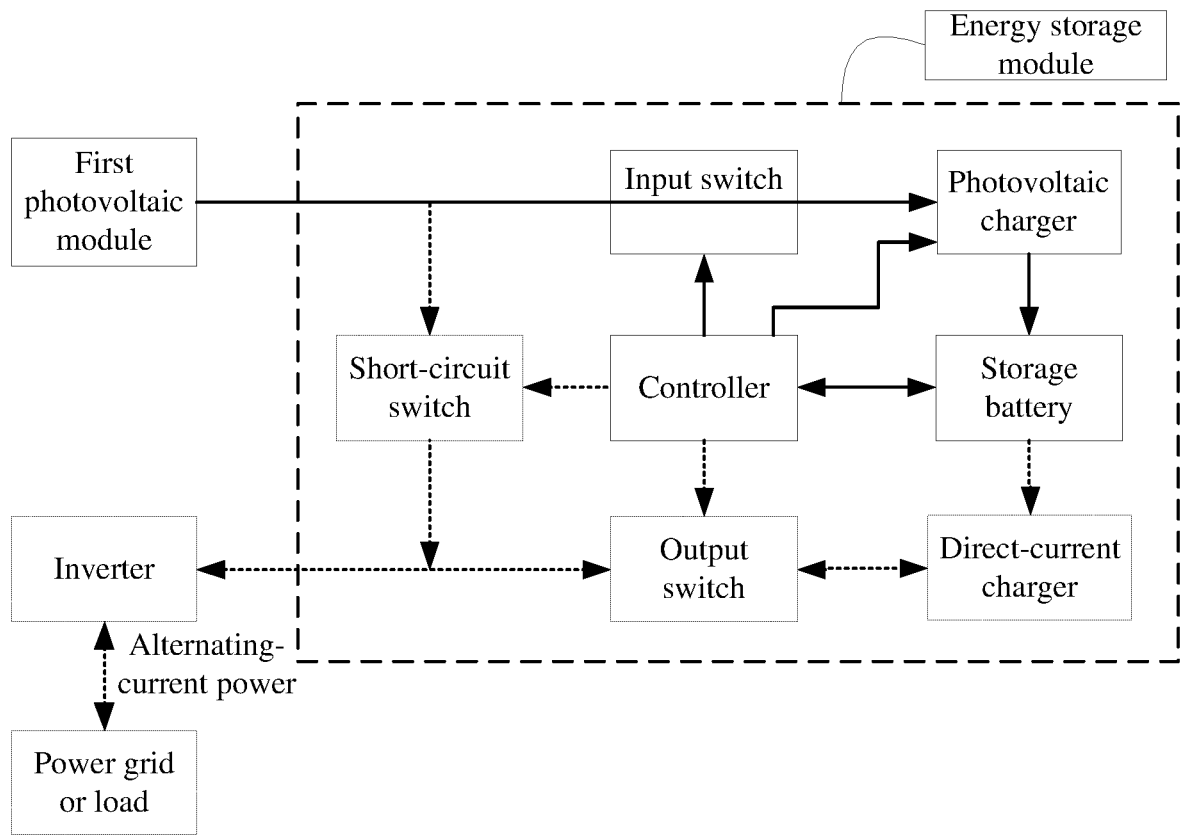
FIG. 7 is a schematic diagram illustrating the energy storage module that is operating in a photovoltaic charging mode according to an embodiment of the present disclosure.
Figure 8:
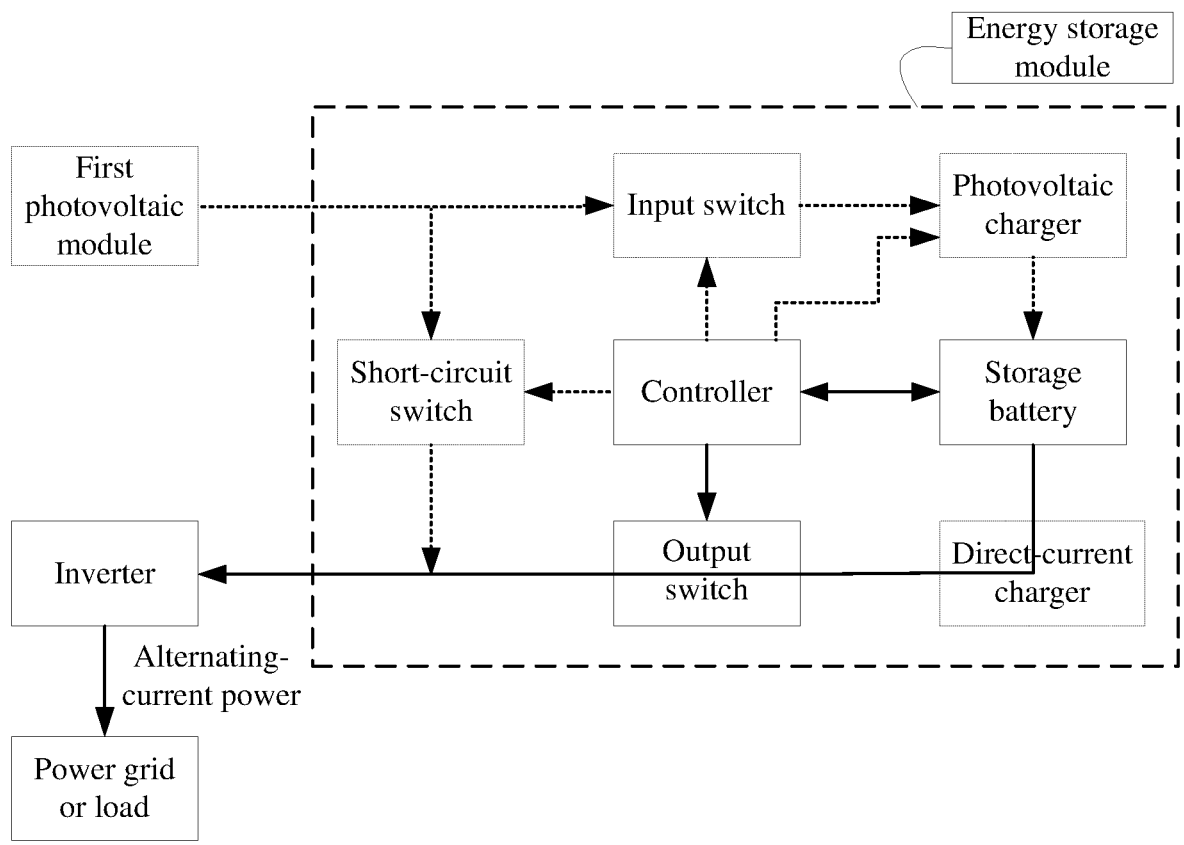
FIG. 8 is a schematic diagram illustrating the energy storage module that is operating in a battery discharging mode according to an embodiment of the present disclosure.

The operating mode of the controller 21 includes but is not limited to the photovoltaic charging mode and the battery discharging mode. The controller 21, when switching the photovoltaic charging mode, switches on the input switch 22 (and switches off other switches), as illustrated in FIG. 7 (in which a solid line indicate a component that is in operation while a dotted line indicates a component that does not operate). The direct current power obtained through conversion by the first photovoltaic module 1 is supplied to the photovoltaic charger 23. The controller 21 controls the photovoltaic charger 23 to supply the storage battery 25 with the direct current power obtained through conversion by the first photovoltaic module 1 (where the photovoltaic charger 23 includes switch transistors, and the controller 21 controls the switch transistors to switch between different states to achieve different states of the storage battery). The controller 21, when switching to the battery discharging mode, switches on the output switch 24 (and switches off other switches), as illustrated in FIG. 8. The direct current power supplied by the storage battery 25 is directly supplied to the inverter 3. The inverter 3 operates in the inverter mode. That is, the inverter 3 converts the direct current power supplied by the storage battery 25 into alternating current power and supplies the alternating current power to the power grid or load. That is, the energy storage module 2 discharges direct current power which is then converted into alternating current power.

In an embodiment, the inverters 3 are bi-directional inverters, and the energy storage module 2 further includes a direct-current charger 26 connected to the power supply terminal of the storage battery 25 and the first terminal of the output switch 24.

The controller 21 is further configured to switch on the output switch 24 when switching to an alternating-current charging mode, for the inverter 3 to convert the alternating current power from the power grid or load into direct current power and supply the direct current power to the storage battery 25 via the direct-current charger 26.

Further, in a case that the inverters 3 according to the present disclosure are bi-directional inverters 3, the energy storage module 2 according to the present disclosure further includes a direct-current charger 26. The energy storage module operates as follows.

Figure 9:
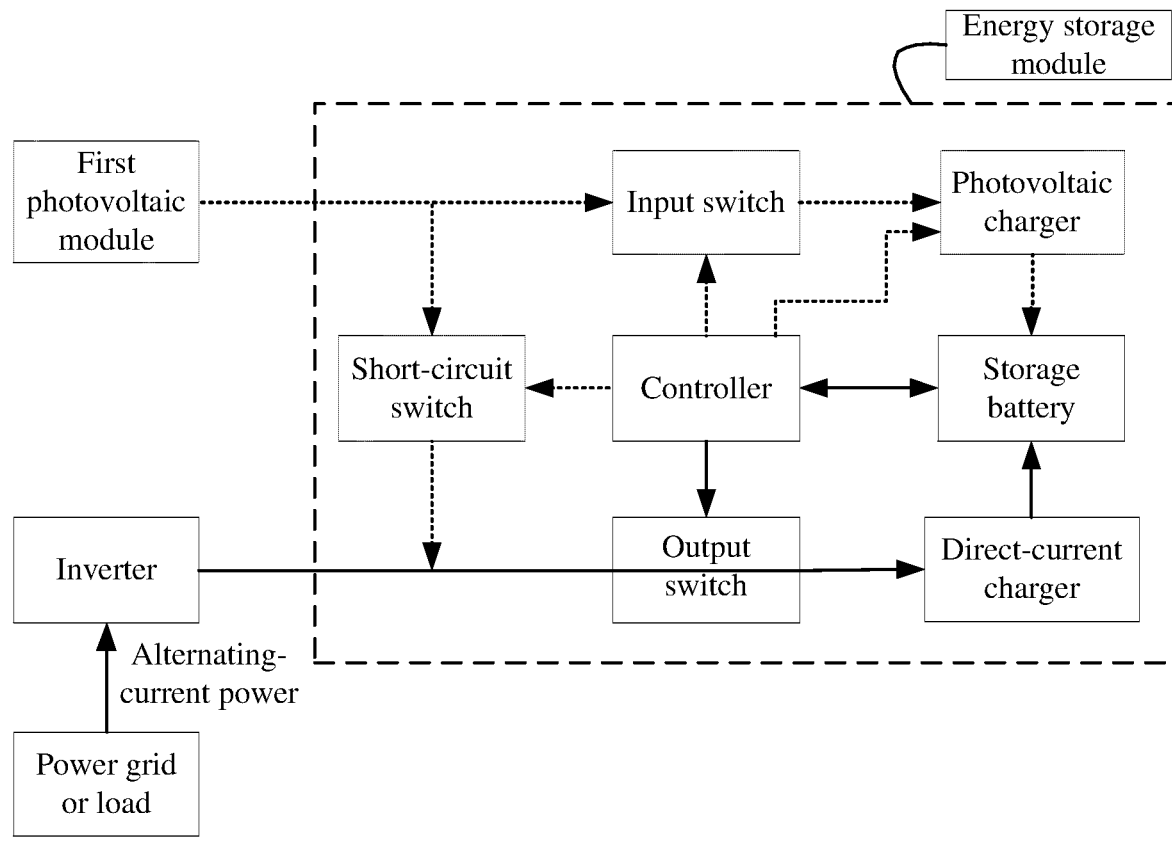
FIG. 9 is a schematic diagram illustrating the energy storage module that is operating in an alternating-current charging mode according to an embodiment of the present disclosure.

The operating mode of the controller 21 further includes the alternating-current charging mode. The controller 21, when switching to the alternating-current charging mode, switches on the output switch 24 (and switches off other switches), as illustrated in FIG. 9. The inverter 3 switches to the rectifier mode. That is, the inverter 3 converts the alternating current power from the power grid or load into direct current power and supplies the direct current power to the storage battery 25 via the direct-current charger 26. That is, the energy storage module 2 is charged with alternating current power.

In an embodiment, the energy storage module 2 further includes a short-circuit switch 27.

A first terminal of the short-circuit switch 27 is connected to the first terminal of the input switch 22 at a joint that serves as the input terminal of the energy storage module 2. A second terminal of the short-circuit switch 27 is connected to the second terminal of the output switch 24 at a joint that serves as the output terminal of the energy storage module 2. A control terminal of the short-circuit switch 27 is connected to the controller 21.

The controller 21 is further configured to switch on the short-circuit switch 27 when switching to the photovoltaic inverting mode, for the inverter 3 to convert the direct current power obtained through conversion by the first photovoltaic module 1 connected to the inverter into alternating current power and supply the alternating current power to the power grid or load for use.

The energy storage module 2 according to the present disclosure further includes the short-circuit switch 27. The energy storage module 2 operates as follows.

Figure 10:
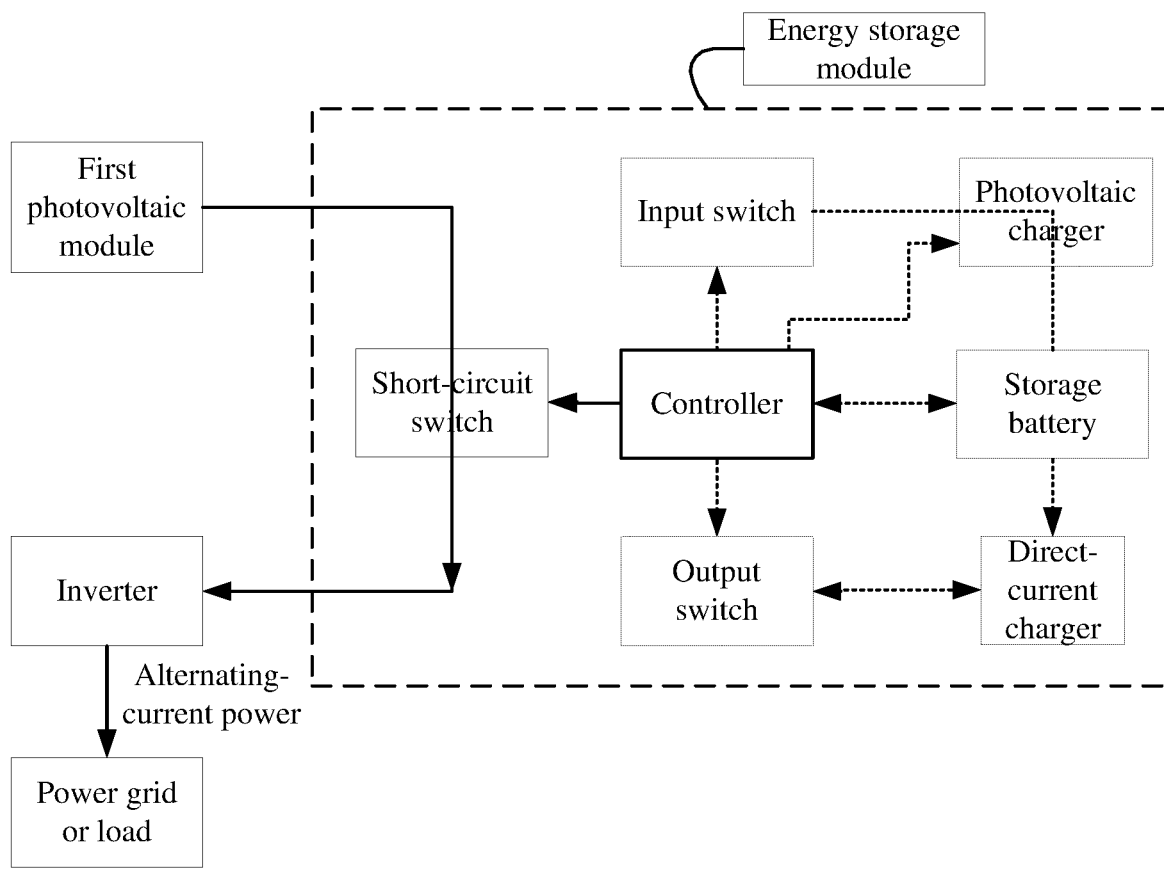
FIG. 10 is a schematic diagram illustrating the energy storage module that is operating in a photovoltaic inverting mode according to an embodiment of the present disclosure.

The operating mode of the controller 21 further includes the photovoltaic inverting mode. The controller 21, when switching to the photovoltaic inverting mode, switches on the short-circuit switch 27 (and switches off other switches), as illustrated in FIG. 10. The direct current power obtained through conversion by the first photovoltaic module 1 is directly supplied to the inverter 3 connected to the first photovoltaic module 1. The inverter 3 operates in the inverter mode, that is, the inverter 3 converts the direct current power supplied by the first photovoltaic module 1 into alternating current power and supplies the alternating current power to the power grid or load for use.

It should be noted that the input switch 22, the output switch 24 and the short-circuit switch 27 in the energy storage module 2 are switched on singly.

In an embodiment, the controller 21 is further connected to the storage battery 25.

The controller 21 is configured to switch between operating modes based on a state of the storage battery 25.

Further, in the energy storage module 2 according to the present disclosure, the controller 21 is further connected to the storage battery 25, and the controller 21 switches between operating modes based on the state of the storage battery 25. For example, the controller 21 switches to the battery discharging mode when determined that power of the storage battery 25 is lower than a preset power threshold. Alternatively, the controller 21 switches between the operating modes depending on other conditions, which is not limited in the present disclosure.

In an embodiment, the energy storage module is arranged under the first photovoltaic module connected to the energy storage module.

The energy storage module according to the present disclosure is arranged under the first photovoltaic module connected to the energy storage module without a special space or special designs for installation, thereby greatly reducing the cost of the system.

It should be further noted that in the present disclosure, the relationship terms such as "first" and "second" are only used herein to distinguish one entity or operation from another, rather than to necessitate or imply that the actual relationship or order exists between the entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, a process, method, article or device limited by "including a (n) . . . " does not exclude existence of another identical element in such process, method, article or device.

Those skilled in the art can implement or practice the present disclosure based on the above description of the disclosed embodiments. Various modifications to the embodiments are apparent for the skilled in the art. The general principle defined herein may be implemented in other embodiments without departing from the spirit or scope of the present disclosure. Therefore, the present disclosure is not limited to the embodiments described herein, but should be in accordance with the broadest scope consistent with the principle and novel features disclosed herein.

The invention claimed is:

1. A distributed photovoltaic system, comprising:
   N first photovoltaic modules each configured to convert solar energy into direct current power;
   N energy storage modules; and
   N inverters, wherein
   N is a positive integer;
   output terminals of the N first photovoltaic modules are connected to input terminals of the N energy storage modules in one-to-one correspondence, output terminals of the N energy storage modules are connected to first input terminals of the N inverters in one-to-one correspondence, output terminals of the N inverters are connected in parallel at a joint configured to connect a power grid or load;
   the N energy storage modules each are configured to store direct current power obtained through conversion by the first photovoltaic module connected to the energy storage module and supply the stored direct current power to the inverter connected to the energy storage module; and
   the N inverters each are configured to convert the direct current power into alternating current power and supply the alternating current power to the grid or load for use.

2. The distributed photovoltaic system according to claim 1, further comprising:
   N second photovoltaic modules each configured to convert the solar energy into direct current power, wherein
   output terminals of the N second photovoltaic modules are connected to second input terminals of the N inverters in one-to-one correspondence; and
   the inverter is further configured to convert the direct current power obtained through conversion by the second photovoltaic module connected to the inverter into alternating current power and supply the alternating current power to the power grid or load for use.

3. The distributed photovoltaic system according to claim 1, wherein
   the N inverters each are a bi-directional inverter; and
   the inverter is further configured to convert alternating current power from the power grid or load into direct current power and supply the direct current power to the energy storage module connected to the inverter for storage.

4. The distributed photovoltaic system according to claim 1, wherein
   the N inverters each are a unidirectional inverter.

5. The distributed photovoltaic system according to claim 1, wherein
   the N energy storage modules each comprise a controller, an input switch, a photovoltaic charger, an output switch and a storage battery, wherein
   a first terminal of the input switch serves as an input terminal of the energy storage module, a second terminal of the input switch is connected to an input terminal of the photovoltaic charger, an output terminal of the photovoltaic charger is connected to a power supply terminal of the storage battery, the power supply terminal of the storage battery is connected to a first terminal of the output switch, a second terminal of the output switch serves as an output terminal of the energy storage module, and the controller is connected to a control terminal of the photovoltaic charger, a control terminal of the input switch and a control terminal of the output switch; and
   the controller is configured to: switch on the input switch when switching to a photovoltaic charging mode, to control the photovoltaic charger to supply the storage battery with the direct current power obtained through conversion by the first photovoltaic module; and switch on the output switch when switching to a battery discharging mode, for the inverter connected to the energy storage module to convert the direct current power supplied by the storage battery into alternating current power and supply the alternating current power to the power grid or load for use.

6. The distributed photovoltaic system according to claim 5, wherein the N inverters each are a bi-directional inverter, and the N energy storage modules each further comprise a direct-current charger connected to the power supply terminal of the storage battery and the first terminal of the output switch, wherein
   the controller is further configured to switch on the output switch when switching to an alternating-current charging mode, for the inverter to convert the alternating current power from the power grid or load into direct current power and supply the direct current power to the storage battery via the direct-current charger.

7. The distributed photovoltaic system according to claim 5, wherein the N energy storage modules each further comprise a short-circuit switch, wherein
   a first terminal of the short-circuit switch is connected to the first terminal of the input switch at a joint that serves as the input terminal of the energy storage module, a second terminal of the short-circuit switch is connected to the second terminal of the output switch at a joint that serves as the output terminal of the energy storage module, and a control terminal of the short-circuit switch is connected to the controller; and
   the controller is further configured to switch on the short-circuit switch when switching to a photovoltaic inverting mode, for the inverter to convert the direct current power obtained through conversion by the first photovoltaic module connected to the inverter into alternating current power and supply the alternating current power to the power grid or load for use.

8. The distributed photovoltaic system according to claim 5, wherein the controller is further connected to the storage battery; and
   the controller is configured to switch between operating modes based on a state of the storage battery.

9. The distributed photovoltaic system according to claim 1, wherein the N energy storage modules are arranged under the respective first photovoltaic modules.

10. The distributed photovoltaic system according to claim 6, wherein the controller is further connected to the storage battery; and
    the controller is configured to switch between operating modes based on a state of the storage battery.

11. The distributed photovoltaic system according to claim 7, wherein the controller is further connected to the storage battery; and
    the controller is configured to switch between operating modes based on a state of the storage battery.

* * * * *